United States Patent [19]
Tripp et al.

[11] Patent Number: 5,470,525
[45] Date of Patent: Nov. 28, 1995

[54] REMOVAL OF BINDER FROM TA PRODUCTS

[75] Inventors: Terrance B. Tripp, Westboro; Malcolm Shaw, Medfield, both of Mass.

[73] Assignee: H. C. Starck, Inc., Newton, Mass.

[21] Appl. No.: 269,580

[22] Filed: Jul. 1, 1994

[51] Int. Cl.$^6$ .................................................. B22F 1/00
[52] U.S. Cl. .................. 419/36; 419/37; 419/39; 419/44
[58] Field of Search .................... 419/36, 39, 44, 419/37

[56] References Cited

U.S. PATENT DOCUMENTS 5,059,388 10/1991 Kihara et al. .................... 419/37
5,082,491 1/1992 Rerat .......................... 75/255

*Primary Examiner*—Donald P. Walsh
*Assistant Examiner*—John N. Greaves
*Attorney, Agent, or Firm*—Jerry Cohen

[57] ABSTRACT

Tantalum anode pellets or tantalum powders are treated to remove carbon content (mostly attributable to binders used in pressing the powders to pellet form and/or sintering of the pellets) by an aqueous leach at 50°–200° F. in lieu of the conventional complex distillation/decomposition methods.

13 Claims, No Drawings

REMOVAL OF BINDER FROM TA PRODUCTS

BACKGROUND OF THE INVENTION

The present application relates to recovery of valuable tantalum from capacitor anodes and other product forms of tantalum mixed with waxy or oily materials, such as stearic acid binders of pressed tantalum pellets.

Tantalum capacitor manufacturers frequently add a binder to tantalum powder prior to pressing pellets. The binder, of which stearic acid is a typical example, helps to lubricate the press die, improves the green strength of the pellet and can contribute to more open porosity and higher capacitance of the sintered pellets. The pressed pellets are heated to 300°–500° C. in vacuum or in an inert gas atmosphere to remove the binder. This debindering operation, even when carried out with great care, is unable to completely remove all residues of carbon associated with the binder. The pellets contain 50–150 ppm carbon, which has been shown to degrade the electrical quality of the anodic oxide film electrochemically deposited on the surface of the sintered pellet. Until recently, most of the residual binder carbon was removed from the pellets during sintering at temperatures of 1,600° C. and above. The new generation of very high CV capacitor grade tantalum powders are frequently sintered below 1,600° C. to take full advantage of the capacitance capability of these high surface area powders. At these lower sintering temperatures, little, if any, clean-up of the tantalum surface occurs, and the carbon deposited on the surface of the sintered pellet will cause the quality of the anodic oxide film to decrease.

Another consequence of removing the binder from pressed pellets by vacuum or inert gas heating is an increase in the oxygen content of the pellets. Heating even at temperatures in the 300°–500° range coupled with the reducing tendency of the binder causes oxygen to pass into the tantalum substrate and strips the tantalum surface of the existing thermal oxide layer. Subsequent exposure of the tantalum surface to oxygen leads to the formation of a new thermal oxide layer and an attendant increase in the oxygen content of the tantalum of 500–1000 ppm. It is well known that a high oxygen concentration will degrade the electrical quality of the anodic oxide film on tantalum. The 500–1000 ppm of oxygen introduced into the tantalum during the binder removal process can be sufficient to cause failure of capacitors, especially if they are made from pellets which are double sintered. To date, capacitor manufacturers have not been able to successfully process double sintered pellets made from powder above the 23,000 CV/gram class if a binder removal step was included in the pellet preparation process.

It is an object of the invention to provide a way of removing binder from pressed pellets that will not add deleterious amounts of carbon and oxygen to tantalum pellets and will therefore not add the performance failures associated with such unwanted carbon and oxygen addition.

It is a further object of the invention to make tantalum pellets more tolerant to oxygen pick up at the sintering stages of processing.

It is a further object of the invention to provide a new approach to scrap tantalum recovery (recovery of valuable tantalum from used electrolytic capacitors) that is more suitable for recycled use compared to conventionally recovered tantalum.

SUMMARY OF THE INVENTION

The foregoing objects are achieved in a process in which the traditional removal of binder by distillation/decomposition is replaced by a step of leaching (washing) with water or in an aqueous detergent solution.

Suitable detergent solutions are selected from, but not restricted to, systems based on sodium or potassium salts of fatty acids, alkyl arenesulfonates, alkyl sulfates, long-chain acid esters of polyethylene glycol, polyethylene glycol esters of alkyl phenols, polyethylene glycol esters of long-chain alcohols and mercaptans, fatty acid diethanolamides and block copolymers of ethylene oxide and propylene oxide. The binders treated thereby can include the traditional ones like stearic acid, ammonium bicarbonate, and carbowax. The washing can be in tumbled baths and packed or unpacked columns or baths with flow of water or detergent solution and binder/tantalum parts, rinsing and other means. It has been found that the aqueous leaching process affords just as good carbon removal as the distillation/decomposition process and does not increase oxygen compared to the distillation/decomposition process.

Further, pressed pellets with anode lead wires attached can be treated by this leach process without breakage or bending of lead wire connections. In some limited cases, the aqueous/detergent solution can be replaced by water alone (i.e. for removal of water soluble binders such as ammonium bicarbonate).

A new range of binders is enabled by the aqueous leaching, e.g. anodes pressed with binders selected from, but not restricted to, such novel groups (for the industry) as fatty acids and their salts, alcohols, molybdenum sulfide, rosin acids, sulfonic acid and carbohydrates. These were precluded earlier because they are unsuitable for distillation/decomposition removal; but they can be removed by leaching with aqueous solutions.

BRIEF DESCRIPTION OF PREFERRED EMBODIMENTS

The practice of the invention according to preferred embodiments thereof is indicated by the following non-limiting examples.

EXAMPLE 1

Fifty gram samples of tantalum powder containing 0.13 W/W % stearic acid were treated with one of five different commercial detergent solutions. Each solution consisted of 400 ml of water and 10 ml of detergent and was maintained at 75° C. In each case, the detergent solution and powder were stirred for 10 minutes and after the powder settled, the liquid was separated from the powder by decantation. The leaching process was repeated twice with new portions of aqueous detergent solution. The residual detergent solution was removed from the powder by rinsing five times with 400 ml portions of 75° C. high purity water. The treated samples were analyzed for carbon and oxygen and the results are summarized in Table I, below. The carbon and oxygen contents of the powder before analysis were 2000 and 2400 ppm respectively. The detergent solution treatment reduced the carbon concentration to between about 50 and 70 ppm. The oxygen concentration decreased slightly, probably as a result of removing the oxygen associated with the binder.

EXAMPLE 2

2.3 kg of tantalum powder containing stearic acid as binder was treated four times with a hot detergent solution composed of 20 liters of high purity water and 500 ml. of a detergent followed by rinsing five times with hot high purity water. Before treatment, the carbon and oxygen concentrations were 2000 ppm and 2400 ppm. After leaching, the carbon and oxygen concentrations were 59 ppm and 2100 ppm.

EXAMPLE 3

Fifty grams of pellets made from tantalum powder containing 0.13 W/W % stearic acid were leached three times for two hours with 400 ml of 75° C. high purity water containing 10 ml of a detergent. The leached pellets were placed in a glass column fitted at the bottom with a porous disk and 60° C. high purity water was passed up through the column at a rate of 600 ml/minute for three hours. The pellets were dried at 65°. The carbon concentration after leaching was 53 ppm.

EXAMPLE 4

Twenty five grams of 0.14 gm pellets pressed to a density of 5.5 g/cc and containing 1 w/w % stearic acid, 0.25 w/w % stearic acid, 2 w/w % carbowax or 2 w/w % Awax were leached and rinsed as described in Example 3. The carbon and oxygen concentrations before and after leaching are summarized in Table I. The process as applied as only moderately effective in removing the Awax, but the results suggest that a more extensive treatments would reduce the carbon content of pellets containing this binder to an acceptable level. The carbon concentrations in all other cases were reduced to the 60 ppm range. The pellets did not pick up oxygen during the leaching process.

EXAMPLE 5

Twenty five grams of 0.14 gm pellets pressed from tantalum powder containing 2 W/W % $H_4HCO_3$ as binder were placed in a glass column fitted at the bottom with a porous plate. High purity water at 60° C. was passed up through the column for four hours at a rate of 600 ml. per minute. The pellets were dried at 65° C. The carbon concentration before and after leaching were 630 ppm and 65 ppm. The corresponding oxygen concentrations were 1660 ppm and 1740 ppm.

EXAMPLE 6

Pellets with lead wires were pressed from tantalum powder containing 0.25 w/w % stearic acid, 2 w/w % carbowax or 2 w/w % ammonium bicarbonate. The pellets containing stearic acid (sa) and carbowax (cw) were leached as described in Example 3. The pellets with $NH_4HCO_3$ (ABC) as binder were treated along with the pellets in Example 5. The carbon concentrations after the binder removal are given in Table II. The treated pellets were sintered at 1400°, 1500° or 1600° for 20 minutes and anodized to 1 OOV and 140 V (1500 sinter) in 0.1 V/V % $H_3PO_4$ solution at 80° C. The current density was 100 mA/gram, and the hold time was two hours.

There were no differences in the leakages of the pellets pressed with binder and leached, and those pressed without binder.

TABLE I

Summary of Carbon and Oxygen Concentration After Leaching

| Detergent Type | Carbon (ppm) | Oxygen (ppm) |
| --- | --- | --- |
| A (Tide) | 57 | 2150 |
| B (Surf) | 53 | 2150 |
| C (Micro) | 54 | 2140 |
| D (Ultra-Era) | 72 | 2130 |
| E (Cascade) | 50 | 2130 |

TABLE II

| Binder Type | Concentration W/W % | Oxygen Before | Carbon Before | Oxygen After | Carbon After |
| --- | --- | --- | --- | --- | --- |
| Stearic Acid | 0.25 | 3380 | 3500 | 3400 | 58 |
| Stearic Acid | 1.0 | 3380 | 19000 | 3400 | 66 |
| Carbowax | 2.0 | 1660 | 11000 | 1740 | 61 |
| Awax | 2.0 | 1660 | 11000 | 2500* | 2500 |
| Ammonium Bicarbonate | 2.0 | 1660 | 630 | 1740 | 65 |

*Includes oxygen from retained Awax

EXAMPLE 7

Pellets were pressed from 0.14 gms of tantalum powder containing 1 W/W % steric acid to a density of 5.5 g/cc. The pellets were placed in a stainless steel basket suspended in a glass column. The column was connected to a heated tank containing an aqueous detergent solution and a source of hot high purity water. The detergent solution was maintained at 70° C. and allowed to pass upward through the column at a rate of 2 l/min. for four hours. Following the leaching process, the pellets were rinsed by passing 60° high purity water through the column for four hours. The carbon concentration before leaching was 19000 ppm and after leaching, it was 67 ppm. The corresponding oxygen concentrations were 3380 and 3400 ppm.

This example illustrates a technique for leaching pressed pellets which will not damage the pellets or lead wires by handling or movement during leaching. Conceptually, the pellets can be placed in a porous sintering tray at the time of pressing and then leached and sintered in the same tray. Simple experiments can easily identify the optimum conditions of detergent solution concentration and composition, solution temperature, leaching time, and rinsing time. Alternatively, baths with circulating detergent solution or water can be used. The pellets contained in a porous sintering tray are placed in the appropriate bath to accomplish leaching or rinsing.

It will now be apparent to those skilled in the art that other embodiments, improvements, details, and uses can be made consistent with the letter and spirit of the foregoing disclosure and within the scope of this patent, which is limited only by the following claims, construed in accordance with the patent law, including the doctrine of equivalents.

We claim:

1. Process of recovery of binder-pressed tantalum pellets with 0.1–3.0 w/o of a carbonaceous binder comprising the step of contacting the pellets at temperatures of 50°–200° F. with aqueous leach liquor and leaching sufficiently to remove at least 95% by weight of binder-source carbon content thereof while maintaining oxygen content of the pellet substantially constant, the said reduction of carbon content being achieved without heating for distillation/decomposition of binder.

2. Process in accordance with claim 1 wherein the leachant is an aqueous detergent solution.

3. Process in accordance with claim 1 wherein the leachant is water.

4. Process in accordance with claim 1 wherein the leaching is carried out for over an hour and sufficiently long to remove 95 w/o of the carbon content thereof.

5. Process in accordance with claim 1 wherein the pellets are placed in a column and leached.

6. Process in accordance with claim 1 wherein the pellets are placed in a bath to achieve leaching and rinsing.

7. A process for treatment of tantalum from binder-pressed-and-double-sintered anode pellets for removal of binder source carbon therefrom without material oxygen pickup in the course of carbon removal, the process comprising the steps of contacting the pellet with an aqueous leach liquor and maintaining the pellet in contact with the leach liquor at 50°–200° F. and sufficiently long to remove at least 95 weight percent of binder carbon content thereof such steps being essentially the only steps undertaken to effect such reduction of carbon content.

8. A process in accordance with either of claims 1 or 7 wherein the binder consists essentially of stearic acid.

9. A process in accordance with either of claims 1 or 7 wherein the sinter steps of pellet manufacture are conducted below 1,600° C.

10. A process as in either of claims 1 or 7 wherein the binder consists essentially of ammonium bicarbonate.

11. A process as in either of claims 1 or 7 wherein the binder consists essentially of carbowax.

12. A process as in either of claims 1 or 7 wherein the binder consists essentially of a material selected from the group consisting of fatty acids and their salts, alcohols, molybdenum sulfide, rosin acids, sulfonic acid and carbohydrates.

13. A process as in either of claims 1 or 7 wherein the pellets are treated for binder removal with an anode lead wire attached to the pellet.

* * * * *